United States Patent
Ayad et al.

(10) Patent No.: US 6,451,267 B1
(45) Date of Patent: Sep. 17, 2002

(54) DEVICE FOR POWERING AN OZONIZER

(75) Inventors: Larbi Ayad, Groslay; Denis Moras, Louvres; Peter Uhlig, Montmorency, all of (FR)

(73) Assignee: Trailgaz - Compagnie Generale de l'Ozone, Garges les Gonesse (FR)

(*) Notice: Subject to any disclaimer, the term of this patent is extended or adjusted under 35 U.S.C. 154(b) by 0 days.

(21) Appl. No.: 09/331,439

(22) PCT Filed: Oct. 26, 1998

(86) PCT No.: PCT/FR98/02290

§ 371 (c)(1),
(2), (4) Date: Jun. 22, 1999

(87) PCT Pub. No.: WO99/22439

PCT Pub. Date: May 6, 1999

(30) Foreign Application Priority Data

Oct. 24, 1997 (FR) .............................. 97 13387

(51) Int. Cl.⁷ .................................................. B01J 19/12
(52) U.S. Cl. ..................... 422/186.15; 363/37; 363/136
(58) Field of Search .............................. 363/34, 37, 39, 363/40, 96, 135, 136; 422/186.07, 186.15, 186.16, 186.18

(56) References Cited

U.S. PATENT DOCUMENTS

| 4,758,940 A | 7/1988 | Steigerwald .................. 363/98 |
| 4,833,583 A | * 5/1989 | Petitimbert ................ 363/64 X |
| 5,135,725 A | 8/1992 | Hendrickson et al. . 422/186.15 |

FOREIGN PATENT DOCUMENTS

DE 35 07 886 9/1986

OTHER PUBLICATIONS

Y. Cheron, *Soft Communication*, pp. 18–31, 220 and 221, Chapman & Hall, 1992. (No Month).

* cited by examiner

*Primary Examiner*—Jessica Han
(74) *Attorney, Agent, or Firm*—Wenderoth, Lind & Ponack, L.L.P.

(57) ABSTRACT

The invention concerns a device for powering an ozonizer (7), characterized in that it includes a direct current power source (8), at the terminals of which are connected a dual series converter bridge coupled with a resonant charge consisting of a high voltage inductance (14) series-connected with the ozonizer (7).

6 Claims, 2 Drawing Sheets

DEVICE FOR POWERING AN OZONIZER

BACKGROUND OF THE INVENTION

The present invention relates to a device for supplying electrical energy to an ozonizer for frequencies from 400 Hz to several tens of kHz.

Presently known industrial ozonizers comprise two electrodes separated by a dielectric and a discharge space in which a dry gas containing oxygen circulates. If a voltage sufficiently high to reach the breakdown point of the gas is applied to the terminals of these electrodes, a corone discharge occurs between them. The brush discharge dissociates the oxygen in the discharge space and thus forms a gas containing a concentration of ozone which depends on the power applied and on the gas flow rate.

Two different types of supply devices for these ozonizers exist in the state of the art.

Supply devices comprise a frequency converter making it possible to increase the supply frequency of the ozonizer with respect to the frequency of the mains and to improve the production of ozone. These converters consist of inverters of parallel or series type, to which is connected either an L.C.-type resonant load or an uncompensated, forced-switching, non-resonant load which is much less expensive than the L.C. loads, but exhibits a deplorable power factor. An arrangement of a series-type inverter is described in French patent No. 39.770 (FR 1 544 857) entitled "Système d'alimentation électrique pour ozoneur" [Electrical supply system for ozonizer].

Another type of series inverter is described in French patent No. 69.17372 entitled "Perfectionnement aux dispositifs d'alimentation à fréquence moyenne d'un circuit récepteur présentant une impédance variable" [Improvement to middle-frequency devices for supplying a receiver circuit exhibiting variable impedance].

On the one hand the improvement in the performance of ozonizers and more particularly their capacity to economically to produce ozone at high concentration is leading to ever more capacitive loads bringing about a large reduction in the power factor of the load as viewed from the power source. These conditions demand the use of load compensation so as to optimize the dimensioning of the power source.

On the other hand, the improvement in the performance of components that generate ozone is leading to the search for an increase in the power applied per unit area (power density), this making it necessary, for a given configuration (Manley's formula), to increase the power density by increasing the frequency or increasing the voltage. The frequencies generally used for industrial ozonizers are currently less than 2000 Hz. Small ozonizers operate at a higher frequency by using supplies which cannot be applied economically to the design of industrial ozonizers.

In the devices described above, it is vital to employ a very particular technique for adjusting the assembly, especially for tuning the high-voltage transformer so as to obtain the best conditions of operation. It is also very important to master the technology of power switches, linked with more constraining switching due to the load. Moreover, these systems also have the disadvantage of needing starter means which complicate the operating sequences and raise the cost of the apparatus. This culminates in relatively complex devices of high cost price and unoptimized operation.

SUMMARY OF INVENTION

The purpose of the invention is to create a device making it possible to design, as inexpensively as possible, a supply for an industrial ozonizer that is stable in operation at frequencies lying between 400 Hz and high frequencies reaching as much as several tens of kHz.

To this end, the subject of the invention is a device for supplying electrical energy to an ozonizer, characterized in that it comprises a DC supply source, to the terminals of which are connected a dual series inverter bridge coupled to a resonant load composed of a high-voltage choke in series with the ozonizer.

BRIEF DESCRIPTION OF THE DRAWINGS

The invention will be better understood with the aid of the following description given merely by way of example and made with reference to the appended drawings in which.

Figure 1:
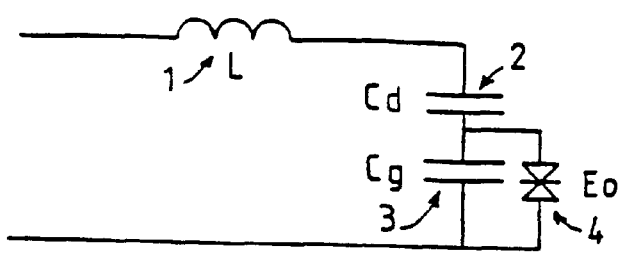
FIG. 1 represents a diagram of a series load composed of an inductance and an ozonizer illustrating the load used according to the invention.

As may be seen in FIG. 1, the resonant circuit of the load of an ozonizer is composed of a high-voltage choke denoted by the reference 1 and an ozonizer consisting of two capacitors, Cd 2 and Cg 3, respectively, one, Cd 2, representing a dielectric and the other, Cg 3, a discharge space filled with a volume of gas, and a Zener diode 4 symbolizing the breakdown voltage Eo of the gas.

The choke 1 and the ozonizer 2, 3, 4 are coupled in series. The choke plays a two-fold role. On the one hand, it makes it possible to compensate for the reactive energy of the circuit, and on the other hand, it raises the voltage on the ozonizer at the desired power level. The assembly oscillates at a resonant frequency $F_o$.

Figure 2:
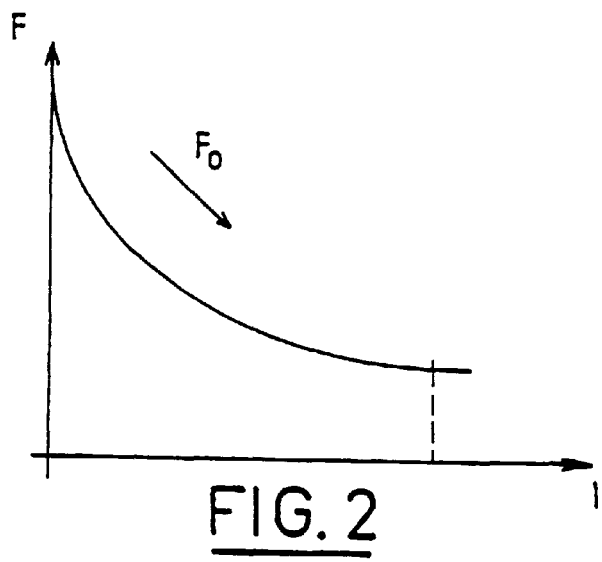
FIGS. 2 and 3 represent curves of the change in impedance as a function of frequency and applied current illustrating the principle of operation of the device according to the invention, FIGS. 4A and 4B respectively represent a diagram of a dual thyristor involved in the construction of the device according to the invention, and its impedance characteristics.

The main characteristics of the ozonizer are that it has a capacitor 3 of variable capacitance Cg dependent on the voltage applied and therefore on the resulting power. The frequency being dependent on this capacitance, the frequency of the circuit naturally varies as a function of the power. It is represented in FIG. 2. This graph shows the change in frequency as a function of the active power applied to the ozonizer.

The main difficulty with this type of circuit is the drop in the resonant frequency $F_o$ as a function of active power. This is because at low power the frequency is greater than at high power.

Figure 3:
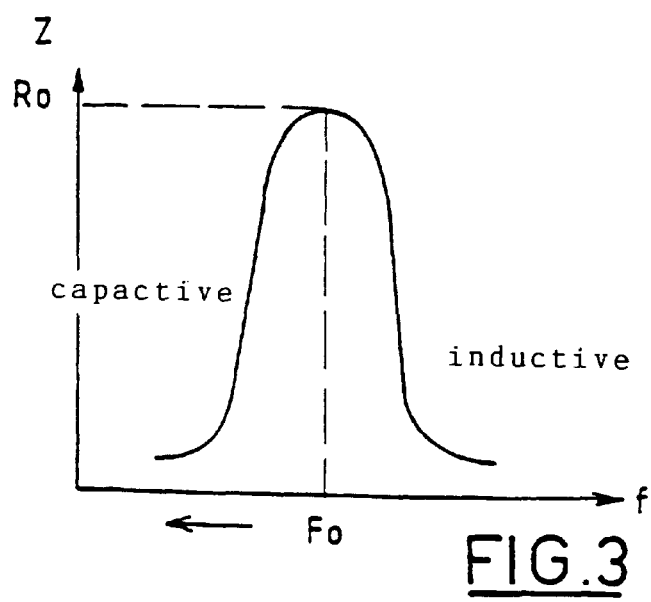

FIG. 3 shows the change in impedance as a function of the frequency of oscillation of the circuit. The natural state of the circuit can be dissected, according to the nature of the load, as follows:

an overall inductive circuit to the right of the resonant point, and an overall capacitive circuit to the left of the resonant point.

The ozonizer therefore exhibits a non-linear impedance varying strongly as a function of the frequency of oscillation of the circuit.

It furthermore exhibits a short-circuit risk which, in the case of a conventional series-type inverter using thyristors, maintains the thyristors of the inverter bridge in a conducting state.

To alleviate these drawbacks, use is made according to the invention of a power member of the dual thyristor type, this making it possible, on the one hand to maintain the frequency of operation of the ozonizer at a value above the resonant frequency of the load and, on the other hand, to block the dual thyristors in case of short-circuit.

Figure 4A:
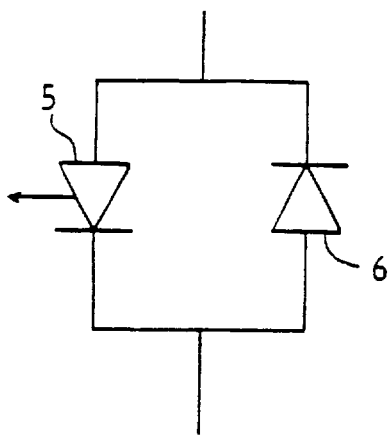

Thus, as may be seen in FIG. 4A, a dual thyristor consists of a switch member denoted by the reference 5 which can be a blockable thyristor, or alternatively a bipolar transistor such as an IGBT or field-effect transistor and, placed in anti-parallel configuration, a switching diode denoted by the reference 6.

Figure 4B:
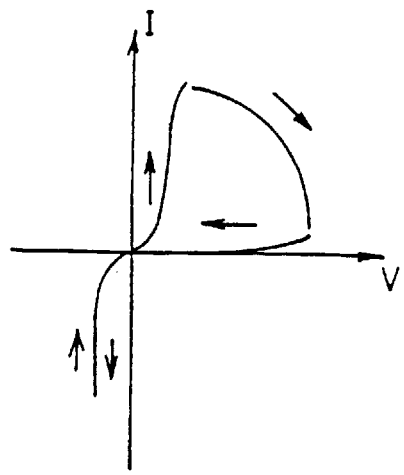

The dual thyristor is a switch member which exhibits the characteristic of being closed or conducting in the natural state, of being made to open and which closes again naturally by reversing the voltage at its terminals. The current versus voltage impedance characteristic represented in FIG. 4B illustrates the switching characteristics of this member used in the invention.

This switch, unlike the conventional thyristor, is conducting in its natural state. It is blocked by a command sent to the gate. The voltage rises at its terminals until the current through the switch member 5 vanishes, the current being able always to flow in reverse in the anti-parallel diode 6. Thus the current can lag with respect to the voltage. With this type of switch, the load must be inductive overall.

In this case, it is possible to operate in a series circuit with the inductor 1 and the ozonizer composed of the capacitors 2 and 3 of respective capacitances Cd and Cg. The operating frequency will be stable since, with the load always being inductive, the operating frequency will always be greater than the resonant frequency allowing stable regulation of the power.

The use of dual thyristors allows stable operation of a series inverter coupled to an inductive load.

Figure 5:
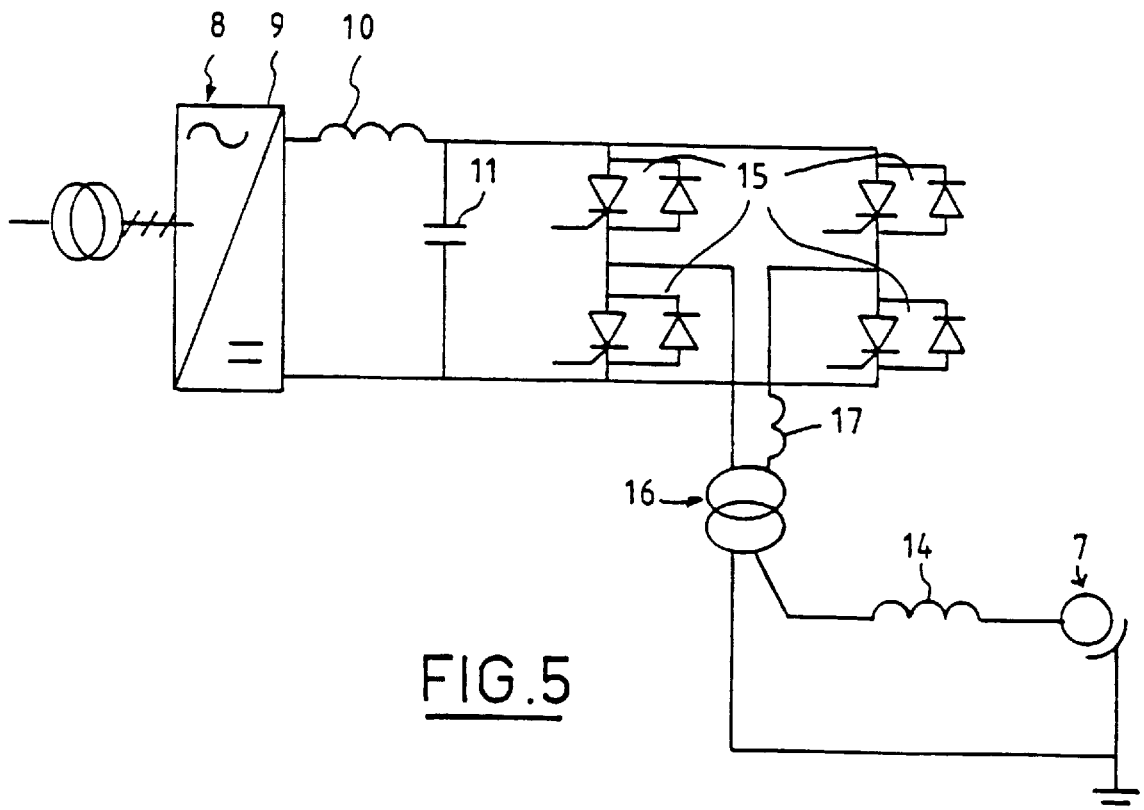
FIG. 5 represents a schematic diagram of a dual series inverter supply device according to the invention.

As may be seen in FIG. 5, the electrical energy supply device according to the invention, makes it possible to supply an ozonizer denoted by the reference 7 from a DC supply source denoted by the reference 8.

This DC supply source can comprise, conventionally, a rectifier bridge of the thyristor Graetz bridge type, denoted by the general reference 9, a smoothing inductor 10 and an assembly of capacitors 11.

The series resonant circuit comprises an inductor 14 and the ozonizer 7. Moreover, four semiconductor dual thyristor technology switch members 15 driven by electronic triggering means (not represented) are connected to the terminals of the load by way of a high-voltage transformer 16 which has leakage inductance 17.

The four dual thyristors 15 operate alternately so as to obtain a voltage signal of rectangular shape. The load circuit composed alternately of the leakage choke 17 of the transformer 16 of the high-voltage choke 14 and of the ozonizer 7 constitutes an overall inductive impedance and operates at a frequency above the resonant frequency locked by a control device (not represented) of conventional type.

The resonant frequency of this load being variable, the inverter follows this frequency which changes in accordance with the power level injected (FIG. 2). In this case, the inverter operates in self-drive mode in which the frequency is imposed by the oscillating circuit (operation in the natural regime). The load is therefore resistive and the phase shift between the voltage and the current on the load is very small.

In technologies of the type with parallel inverters, when the operating frequency becomes too large, the leakage choke 17 of the high-voltage transformer 16 becomes a disturbing element since the switching times become too large for high frequencies. Operation at high frequency implies a large reduction of the leakage choke, thereby making the design of the high-voltage transformer difficult or even impossible.

This problem does not occur in a series inverter technique since the leakage choke is added to the load circuit without becoming a disturbing element and thus makes it possible to obtain correct switching times for the series inverter.

The main role of the high-voltage inductor 14 is to compensate for the low power factor of the load represented by the ozonizer and at the same time its effect is to raise the voltage at the terminals of the ozonizer. Thus, for a given power, lower voltages are obtained at the output of the high-voltage transformer 16.

These voltage levels become closer to the output voltages from the inverter. This makes it possible to eliminate the high-voltage transformer 16 and thus to produce direct coupling between the dual series inverter and the load composed of the high-voltage inductor and the ozonizer.

What is claimed is:

1. A device for supplying electrical energy to an ozonizer, comprising:
   a DC supply source;
   a series inverter bridge having switch members of a dual thyristor type electrically connected to said DC supply source, said switch members being closed or conducting in a natural state and being adapted to made to be open and to reclose naturally by reversing a voltage at terminals of said switch members; and
   a resonant load having a high-voltage choke in series with the ozonizer, said resonant load electrically connected to said series inverter bridge.

2. A device for supplying electrical energy to an ozonizer as claimed in claim 1, wherein said series inverter bridge is operable in a self-drive mode.

3. A device for supplying electrical energy to an ozonizer as claimed in claim 2, further comprising a high voltage transformer having a leakage choke and being electrically connected between said series inverter bridge and said resonant load, wherein said leakage choke, said high-voltage choke and the ozonizer result in an impedance which is inductive at a frequency of operation of the ozonizer determined by a device operable to control said series inverter bridge, the frequency of operation being greater than a resonant frequency of said resonant load.

4. A device for supplying electrical energy to an ozonizer as claimed in claims 2, wherein said series inverter bridge is directly electrically connected to said resonant load.

5. A device for supplying electrical energy to an ozonizer as claimed in claim 1, further comprising a high voltage transformer having a leakage choke and being electrically connected between said series inverter bridge and said resonant load, wherein said leakage choke, said high-voltage choke and the ozonizer result in an impedance which is inductive at a frequency of operation of the ozonizer determined by a device operable to control said series inverter bridge, the frequency of operation being greater than a resonant frequency of said resonant load.

6. A device for supplying electrical energy to an ozonizer as claimed in claim 1, wherein said series inverter bridge is directly electrically connected to said resonant load.

* * * * *